(12) United States Patent
Tsuge et al.

(10) Patent No.: US 6,844,719 B2
(45) Date of Patent: Jan. 18, 2005

(54) ROTATIONAL SPEED DETECTOR HAVING ELONGATE DETECTING SURFACE AND METHOD OF MANUFACTURING THE SAME

(75) Inventors: Hiroyuki Tsuge, Nisshin (JP); Mikio Tanabe, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/151,874

(22) Filed: May 22, 2002

(65) Prior Publication Data

US 2003/0001566 A1 Jan. 2, 2003

(30) Foreign Application Priority Data

Jun. 29, 2001 (JP) ........................................ 2001-199127

(51) Int. Cl.[7] .............................. G01P 3/48; G01P 1/02
(52) U.S. Cl. .................... 324/174; 324/207.22; 73/431; 73/493
(58) Field of Search .......................... 73/493, 431, 494; 324/207.15, 207.16, 207.21, 207.22, 207.25, 207.2, 207.13, 251, 252, 173, 174; 384/448; 336/92, 98, 110

(56) References Cited

U.S. PATENT DOCUMENTS

| | | | | |
|---|---|---|---|---|
| 4,595,897 A | * | 6/1986 | Amano et al. | 335/205 |
| 4,847,557 A | * | 7/1989 | Saito et al. | 324/207.13 |
| 5,195,831 A | * | 3/1993 | Faye et al. | 384/448 |
| 5,196,794 A | * | 3/1993 | Murata | 324/251 |
| 5,381,089 A | * | 1/1995 | Dickmeyer et al. | 324/174 |
| 5,563,510 A | * | 10/1996 | Gorrell et al. | 324/174 |
| 5,631,557 A | | 5/1997 | Davidson | |
| 5,640,087 A | | 6/1997 | Alff | |
| 5,922,953 A | * | 7/1999 | Payne et al. | 73/494 |
| 6,157,186 A | | 12/2000 | Aoki et al. | |
| 6,326,779 B1 | | 12/2001 | Shinjo et al. | |
| 6,334,361 B1 | | 1/2002 | De Volder et al. | |

FOREIGN PATENT DOCUMENTS

| | | |
|---|---|---|
| EP | 0 727 647 B1 | 8/1996 |
| FR | 2 723 200 | 2/1996 |
| JP | 11-230782 | 8/1999 |
| JP | A-2000-180460 | 6/2000 |
| JP | A-2000-310646 | 11/2000 |

* cited by examiner

*Primary Examiner*—Jay Patidar
*Assistant Examiner*—Darrell Kinder
(74) *Attorney, Agent, or Firm*—Posz & Bethards, PLC

(57) ABSTRACT

A rotational speed detector such as a wheel speed detector has an elongate housing containing a detector unit therein. The detector unit is a molded unit having a sensor element and an integrated circuit chip for processing sensor signals. A front wall of the elongate housing faces a magnetized rotor rotated by a rotating object so that the rotational speed of the rotor is detected by the detector unit. After the housing and a center rod having a terminal wire for leading out the detected electrical signals are connected to each other, a resin mold covering an outside of the center rod and a part of the housing is formed to formulate a unitary body of the rotational speed detector.

18 Claims, 4 Drawing Sheets

ROTATIONAL SPEED DETECTOR HAVING ELONGATE DETECTING SURFACE AND METHOD OF MANUFACTURING THE SAME

CROSS-REFERENCE TO RELATED APPLICATION

This application is based upon and claims benefit of priority of Japanese Patent Application No. 2001-199127 filed on Jun. 29, 2001, the content of which is incorporated herein by reference.

BACKGROUND OF THE INVENTION

1. Field of the Invention

The present invention relates to a rotational speed detector for detecting a rotational speed such as a wheel speed of an automobile and to a method of manufacturing the detector.

2. Description of Related Art

An example of a conventional wheel speed detector which is installed on a vehicle to face a rotor rotating together with a vehicle wheel is disclosed in JP-A-11-14644. In this detector, a sensor element is disposed in a depressed portion of a sensor housing, and the sensor element and associated circuits are covered with a resin material to protect them against water. The sensor element covered with the resin is positioned to face the rotor. A sufficient air gap between the detector and the rotor is required to absorb a dimensional dispersion of those components and vibration of a driving axle due to driving on a rough road or rolling of a vehicle body. On the other hand, it is required to make a distance between the sensor element and the rotor sufficiently small to obtain sensor signals at a high level.

Because a resin layer covering the sensor element is interposed between the rotor and the sensor element in the conventional detector described above, it is necessary to make the resin layer thin to satisfy both requirements. However, it is difficult to make the resin layer thin because a certain thickness of the resin layer is necessary to provide a good sealing against water when the detector is used under severe environmental conditions.

SUMMARY OF THE INVENTION

The present invention has been made in view of the above-mentioned problem, and an object of the present invention is to provide an improved rotational speed detector which is able to generate accurate signals while providing a sufficiently large air gap between the detector and a rotor.

The rotational speed detector is composed of an elongate housing in which a detector unit is contained, a resin center rod having a terminal wire connected to a lead wire led out from the detector unit, and a resin mold covering the outside of the center rod and filling a part of an inside space of the housing. The detector unit includes a sensor element and an integrated circuit chip for processing signals from the sensor element. The elongate housing has a front wall facing a magnetized rotor rotated by a rotating object such as a driving wheel of an automotive vehicle. The rotational speed of the rotating object is detected by the sensor element in the detector unit. An air gap between the front wall of the detector and the rotor has to be made sufficiently large to absorb any vibration of the rotor relative to the front wall of the detector, while securing a high sensitivity of the detector. For this purpose, the detector unit has to be tightly held in the housing to avoid any air-gap loss.

In a manufacturing process of the rotational speed detector, the lead wire led out from the detector unit is electrically connected to the terminal wire molded in the resin center rod. Then, the detector unit is inserted into the housing, and the housing is mechanically connected to the center rod. The center rod and the housing thus connected are put in a molding die, and a resin material is supplied to the molding die. The resin material fills a part of the inner space of the housing to fixedly hold the detector unit in the housing and covers the outside of the center rod and a part of the outer periphery of the housing, thereby forming an integral resin mold that firmly connects components of the rotational speed detector into a single body. The resin mold does not cover the front surface of the housing that faces the rotor.

The detector unit is made in a form of a thin plate and firmly held in the elongate housing to avoid any gap loss. Accordingly, the air gap between the front wall of the housing and the rotor can be made sufficiently large while securing a high sensitivity of the detector. The detector unit is held in the housing by engaging a step made on the detector unit with a step made on the housing. Therefore, the detector unit is correctly positioned in the housing, making the front surface of the detector unit contact the front wall of the housing. The housing and the center rod are connected to each other by inserting a projection made on the housing into a depression made on the center rod to firmly connect both parts.

The resin mold covering the outside of the center rod and part of the housing is made relatively thin to avoid formation of voids or cavities in the resin mold. The detector unit contained in the housing is protected against water by the resin filling an open space of the housing. A projected portion is formed around a flange of the housing that is covered by the resin mold, and the projected portion is melt by heat of the resin in the molding process. In this manner, the housing and the resin mold can be water-tightly connected to each other. Further, a part of the resin mold fills a ditch formed on the inside surface of the rear wall to tightly hold the detector unit in the housing.

According to the present invention, a sufficient air gap is provided between the detector and the rotor, while securing a high sensitivity of the detector. The detector can be efficiently manufactured at a low cost.

Other objects and features of the present invention will become more readily apparent from a better understanding of the preferred embodiment described below with reference to the following drawings.

DETAILED DESCRIPTION OF THE PREFERRED EMBODIMENT

Figure 1:
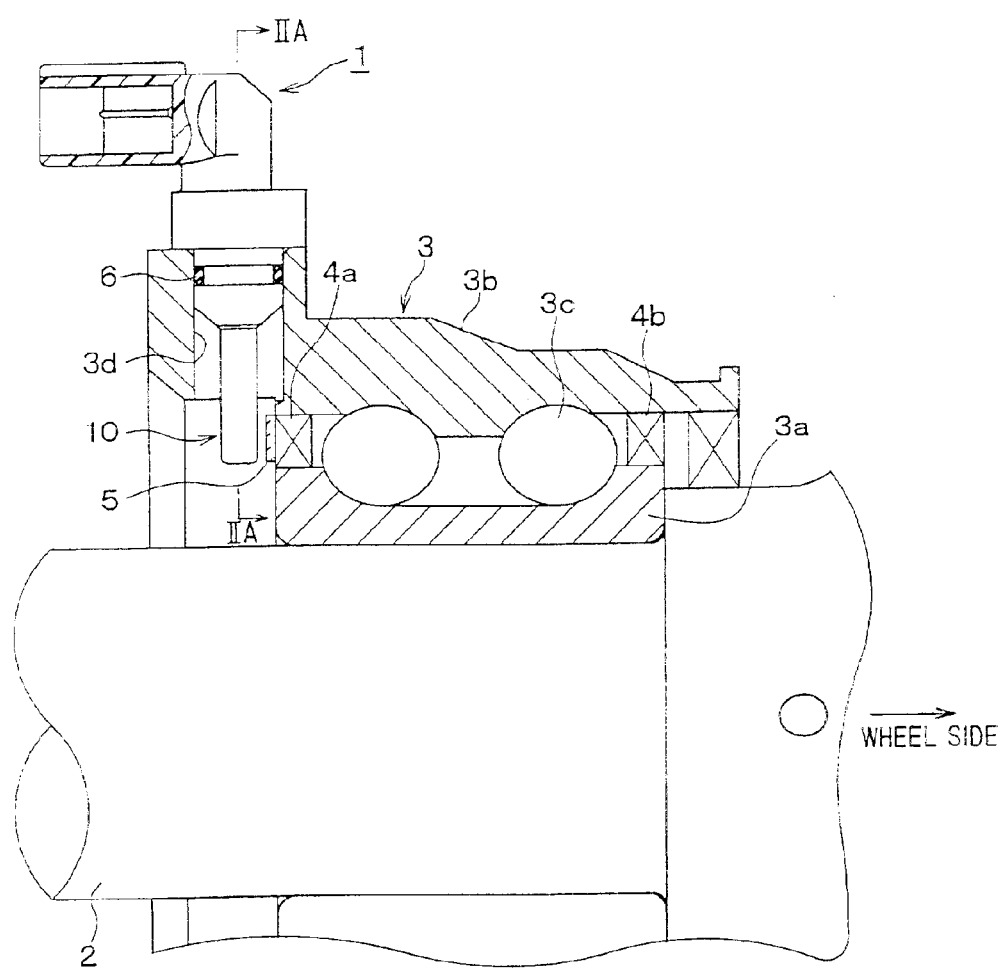
FIG. 1 is a cross-sectional view showing a portion of an axle of an automobile where a wheel speed detector of the present invention is installed.

A preferred embodiment of the present invention will be described with reference to accompanying drawings. First, referring to FIG. 1, a portion of a driving axle where a wheel speed sensor 1 of the present invention is mounted will be described. A bearing 3 is disposed on a driving axle 2 of an automobile. The bearing 3 is composed of an inner ring 3a fixed to the axle 2, an outer ring 3b fixed to a vehicle body (not shown) and balls 3c disposed between the inner ring 3a and the outer ring 3b. A pair of oil seals 4a and 4b are disposed at both ends of the bearing 3, so that lubricant filling a space between the inner ring 3a and the outer ring 3b is prevented from flowing out. A ring-shaped rotor 5 is attached to one of the oil seals 4a. The rotor 5 rotates together with the inner ring 3a, representing a rotational speed of the vehicle wheel. The ring-shaped rotor 5 is magnetized to form alternately N and S poles thereon and disposed coaxially with the driving axle 2 around a circumference of driving axle 2.

A hole 3d is formed in the outer ring 3b, and the wheel speed detector 1 is forcibly inserted into the hole 3d and fixed thereto. An elongate housing of the detector 1 extends downwardly from the hole 3d so that a detector unit 10 contained in the housing faces the rotor 5. An upper portion of the detector 1 extends upwardly from the hole 3d, and an O-ring 6 is disposed in an outer groove formed at a middle portion of the detector 1 to prevent water from entering through the hole 3d.

Figure 2A:
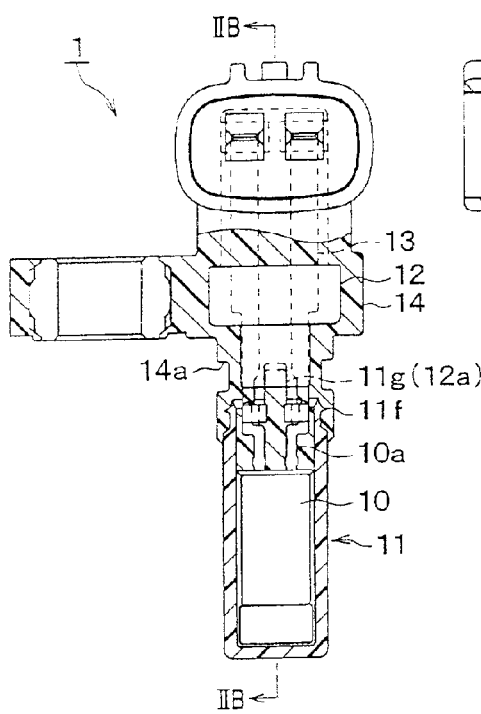
FIG. 2A is a cross-sectional view showing the wheel speed detector.
Figure 2B:
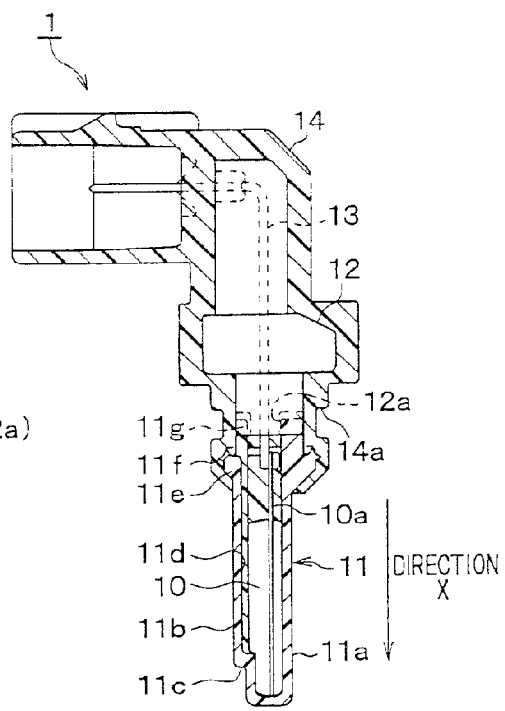
FIG. 2B is a cross-sectional view showing the wheel speed detector, taken along line IIB—IIB shown in FIG. 2A.
Figure 2C:
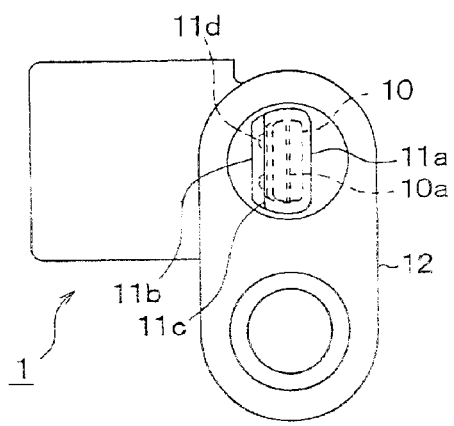
FIG. 2C is a plan view showing the wheel speed detector, viewed from a bottom side of FIG. 2B.

Referring to FIGS. 2A–2C, a structure of the wheel speed detector 1 will be described. The detector 1 is composed of an elongate housing 11 in which a detector unit 10 is inserted, a center rod 12 connected to the housing 11, and a resin mold 14 formed around the center rod 12 and an upper portion of the housing 11. The detector unit 10 is a molded unit, in which a sensor element such as an MRE (magnetoresistive element) for generating output signals responsive to changes in magnetic field, an integrated circuit chip for processing the output signals from the sensor element, a lead wire 10a, and other components are molded together with a resin material. The detector unit 10 is inserted into an inner space of the elongate housing 11 in a direction X shown in FIG. 2B.

The housing 11 is formed in a substantially rectangular pillar shape having an elongate inner space. One end of the housing 11 is closed and the other end is opened. The detector unit 10 is inserted into the housing 11 from the open end. A front sidewall of the housing 11 that faces the rotor 5 constitutes a detecting surface 11a, and a rear sidewall opposite to the front sidewall forms a rear surface 11b. A step 11c is formed on the rear sidewall at a position close to the closed end of the housing 11. The inner space of the housing 11 has a rectangular cross-sectional area which substantially fits the size of the detector unit 10. Ditches 11d (shown in FIGS. 2B and 2C) are formed on the rear wall along a direction X. A part of the resin material forming the resin mold 14 flows into the ditches 11d and fills the ditches 11d in a manner explained later.

A circular flange 11e is formed around the outer periphery of the housing 11 at a position close to the open end of the housing 11. A portion of the outer periphery of the circular flange 11e is further projected outwardly, forming a circularly projected portion 11f. Further, a projection 11g projected upwardly from the open end of the housing 11 is formed, so that the projection 11g engages with a depression 12a formed on the bottom end of the center rod 12. The center rod 12 and the housing 11 is fixedly connected to each other by inserting the projection 11g into the depression 12a.

The center rod 12 is made of resin, and a terminal wire 13 is held in the center rod 12 by molding together. The terminal wire 13 is bent at right angle at a middle portion thereof, and one end of the terminal wire 13 extends from the bottom end of the center rod 12 while the other end extends from a side of the center rod 12, as shown in FIG. 2B. One end of the terminal wire 13 downwardly extending from the center rod 12 is electrically connected to an upwardly extending end of a lead wire 10a led out from the detector unit 10. The other end of the terminal wire 13 extending from the side of the center rod 12 serves as a terminal to be connected to an outside device such as an electronic unit for controlling an anti-block braking system.

The center rod 12 having the terminal wire 13 therein and the housing 11 containing the detector unit 10 therein are connected into a unitary body by resin molding. The molded resin forms the resin mold 14 that covers the center rod 12 and the circular flange 11e of the housing 11, as shown in FIG. 2B. The molding resin also flows into an upper part of the inner space of the housing 11 and the ditch 11d formed on the inner surface of the rear wall. An outer groove 14a to which the O-ring 6 is inserted is also formed on the resin mold 14. The detecting surface 11a and the rear surface 11b of the housing 11 are not covered by the resin mold 14.

Figure 3A:
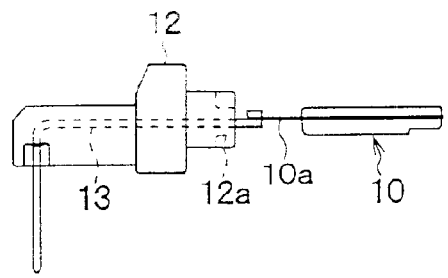
FIGS. 3A–3D show, in sequence, a process of manufacturing the wheel speed detector.
Figure 3B:
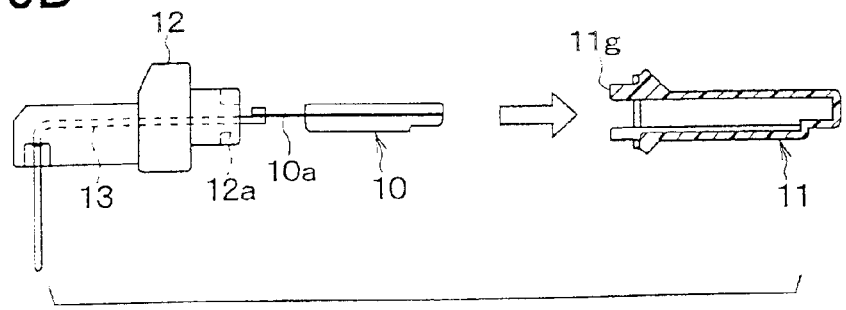

A process of manufacturing the wheel speed detector 1 will be described with reference to FIGS. 3A–3D. First, the detector unit 10 having the lead wire 10a molded together with other components and the center rod 12 molded with resin together with the terminal wire 13 are prepared. Then, the lead wire 10a and the terminal wire 13 are connected to each other by welding or other methods such as heat-staking, as shown in FIG. 3A. The detector unit 10 connected to the center rod 12 is inserted into the inner space of the housing 11 which is separately prepared, as shown in FIG. 3B.

Figure 3C:
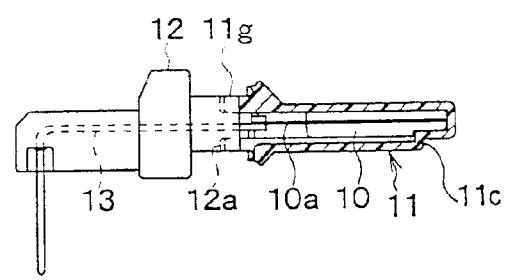
Figure 3D:
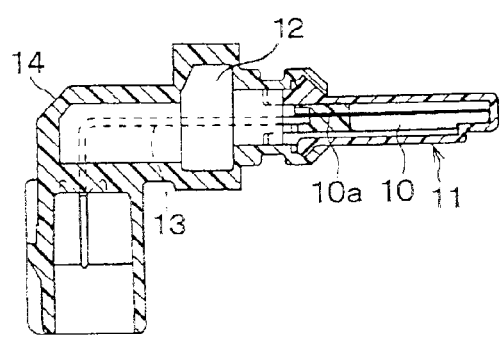

As shown in FIG. 3C, the center rod 12 is connected to the housing 11 by inserting the projection 11g of the housing 11 into the depression 12a of the center rod 12. At the same time, the detector unit 10 is inserted into the inner space of the housing 11 up to the bottom thereof. The step formed at the end portion of the detector unit 10 abuts the step 11c of the housing 11. In this manner, the detector unit 10 is correctly assembled to the housing 11 so that the front surface of the detector unit 10 contacts the front wall of the housing 11 without fail. Since the thickness of the detector unit 10 is made substantially equal to the distance between the front wall and the rear wall of the housing 11, the detector unit is correctly positioned in the inner space of the housing 11.

Figure 4:
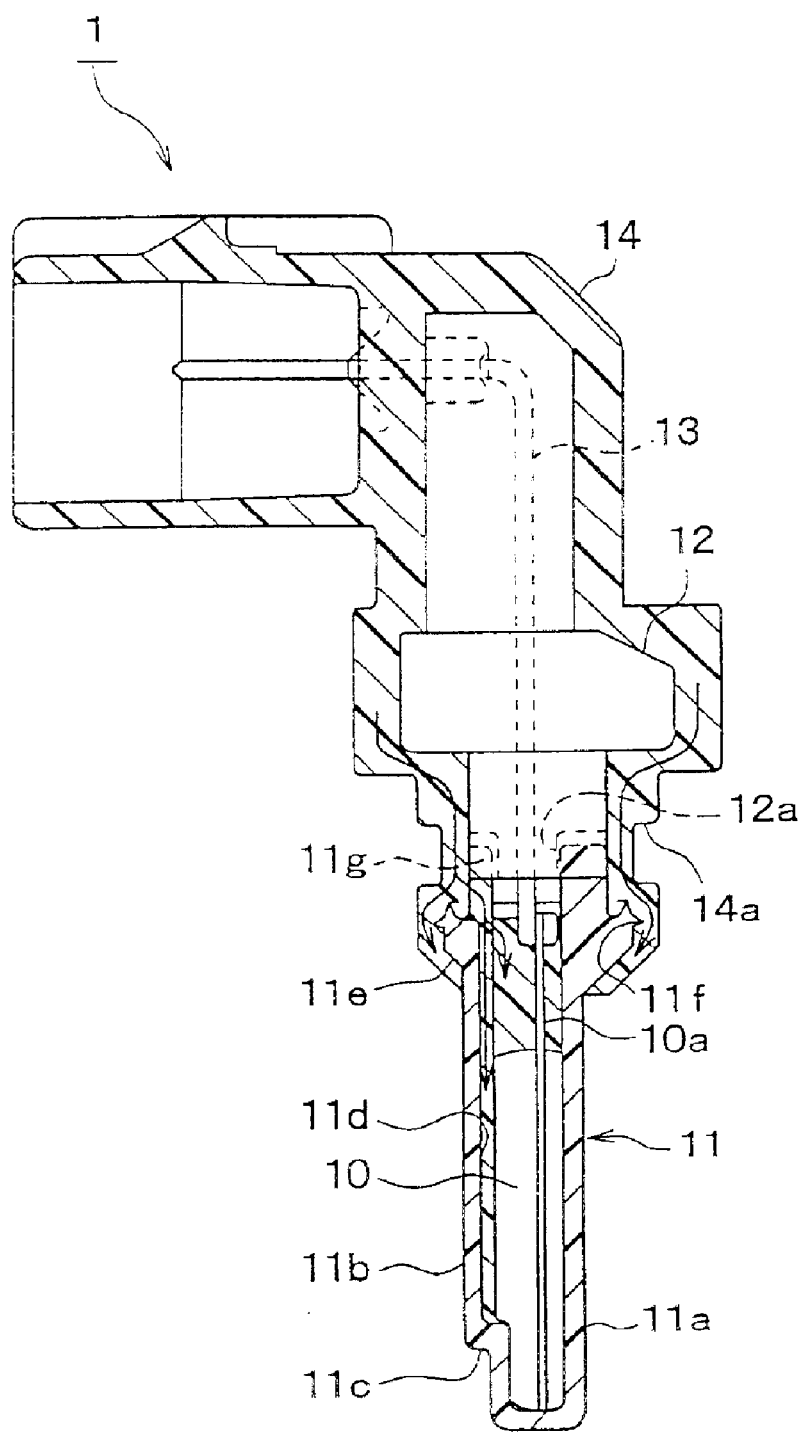
FIG. 4 is a cross-sectional view showing directions of resin flow in a process of forming a resin mold.

Then, the unitary body of the housing 11 and the center rod 12 is disposed in a molding die (not shown), and a resin material is supplied into the molding die to form the resin mold 14 which firmly connects the housing 11 and the center rod 12 together. In the molding process, the resin material flows in directions shown by arrows in FIG. 4. As shown in FIG. 4, the resin flows along the outer periphery of the circular flange 11e. The projected portion 11f formed on the outer periphery of the flange 11e is melted by heat of the resin, and thereby the flange 11e is firmly connected to the resin mold 14. In this manner, water entering into the detector unit 10 through a contacting surface between the flange 11e and the resin mold 14 is surely prevented. In the molding process, the resin also enters into the inner space of the housing 11 thereby to fill the space above the detector unit 10. Further, the resin flows into the ditch 11d formed on the rear wall of the housing 11 thereby to firmly fix the detector unit 10 in the inner space of the housing 11.

It may be possible to form the center rod portion at the same molding process of forming the resin mold 14 without using a separately formed center rod 12. However, it is preferable to use the separately formed center rod 12 because the thickness of the resin mold 14 can be made thin, and thereby formation of voids or small cavities which may be formed in a thicker resin mold can be avoided.

The wheel speed detector 1 described above has the following advantages. Since the detector unit 10 having the sensor element is inserted into the housing 11 that includes the detecting surface 11a and is tightly held therein, a total thickness of the detector unit 10 including the detecting surface 11a can be made thin. Accordingly, an air gap between the rotor 5 and the detecting surface 11a can be made sufficiently wide without sacrificing the sensing ability of the detector 1. Since the ditch lid filled with the resin forming the resin mold 14 is formed on the inside surface of the rear wall of the housing 11, the detector unit 10 tightly contacts the front wall forming the detecting surface 11a. Accordingly, any gap loss between the sensor element and the detecting surface 11a can be avoided.

Since the step formed on the detector unit 10 abuts the step formed on the rear wall of the housing 11 when the detector unit 10 is inserted into the housing 11, the detector unit 10 can be correctly positioned in the housing 11 so that the front side of the detector unit 10 contacts the front wall of the housing 11 without fail. Since the center rod 12 and the housing 11 are connected to each other by inserting the projection 11g into the depression 12a, both can be firmly and correctly connected. Since the projected portion 11f is formed on the outer periphery of the circular flange 11e, the housing 11 can be water-tightly connected to the resin mold 14.

The present invention is not limited to the embodiment described above, but it may be variously modified. For example, the magnetized rotor 5 in a flat-ring shape may be replaced with a rotor having teeth. Though the detecting surface 11a faces the rotor 5 in an axial direction of the rotor 5 in the above embodiment, the detecting surface 11a may be positioned to face the rotor in a radial direction of the rotor 5. The present invention may be applied to other rotational speed detectors than the wheel speed detector 1 described above.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A rotational speed detector adapted to be positioned to face a rotating object, the rotational speed detector comprising:
   a resin elongate housing having a closed end and an open end, and a front sidewall and a rear sidewall; and
   a detector unit inserted and firmly held in the elongate housing, wherein:
      the front sidewall of the elongate housing forms a detecting surface that faces the rotating object; and
      a step is formed on the rear sidewall at a position close to the closed end of the housing, the step engaging with another step formed on the detector unit so that the detector unit is correctly held in the housing.

2. The rotational speed detector as in claim 1 wherein:
   the detector unit is a molded unit that includes a sensor element and an integrated circuit for processing signals from the sensor element, both of the sensor element and the integrated circuit being molded together.

3. The rotational speed detector as in claim 2, wherein:
   the rotational speed detector further comprises a center rod having a terminal wire molded therein with resin forming the center rod; and
   the terminal wire is electrically connected to a lead wire led out from the detector unit.

4. The rotational speed detector as in claim 3, wherein:
   the housing includes a projection formed at the open end thereof;
   the center rod includes a depression formed at one end thereof; and
   the housing and the center rod are connected to each other by inserting the projection of the housing into the depression of the center rod.

5. The rotational speed detector as in claim 4, wherein:
   a resin material fills a portion of an inside space of the housing at a position close to the open end and covers at least an outer periphery of the housing at a position close to the open end, the resin material forming a resin mold.

6. The rotational speed detector as in claim 5, wherein:
   a projected portion is formed around the outer periphery of the housing at a position close to the open end, and the housing is firmly connected to the resin mold by welding the projected portion.

7. The rotational speed detector as in claim 5, wherein:
   a ditch is formed on an inner surface of the rear sidewall, and the resin material further fills the ditch thereby to tightly hold the detector unit in the housing.

8. The rotational speed detector as in claim 5, wherein:
   the resin material further covers an outside of the center rod, thereby integrally forming the resin mold.

9. The rotational speed detector as in claim 8, wherein:
   an outer groove in which a seal ring is to be disposed is formed around an outer periphery of the resin mold at a position close to the open end of the housing.

10. A wheel speed sensor for a wheel bearing assembly comprising:
    a resin elongate housing for being inserted into the wheel bearing assembly and including a proximal open end and a distal closed end, as well as a front detection surface and a rear surface; and
    a wheel speed detector positioned within the elongate housing and extending lengthwise from the proximal open end toward the distal closed end and being closer to the front detection surface than to the rear surface, wherein:
      the wheel speed detector includes a sensor element and an integrated circuit molded with the sensor element for processing signals from the sensor element;
      the wheel speed detector further comprises a resin center rod having a terminal wire molded therein, wherein the terminal wire is electrically connected to a lead wire extending from the detector unit;
      the resin elongate housing includes a projection formed at the proximal open end thereof;
      the resin center rod includes a depression formed at one end thereof; and
      the projection of the resin elongate housing is inserted into the depression of the center rod to connect the resin elongate housing and the resin center rod.

11. The wheel speed sensor as in claim 10, further comprising:
    a resin mold including resin material filling a portion of an inside space defined within the resin elongate housing located close to the proximal open end, and covering at least an outer periphery of the resin elongate housing located close to the proximal open end.

12. The wheel speed sensor as in claim 11, wherein:

a ditch is formed on an inner surface of the rear sidewall, the resin material of the resin mold further filling the ditch to tightly hold the wheel speed detector in the resin elongate housing.

13. A rotational speed detector adapted to be positioned to face a rotating object, the rotational speed detector comprising:

a resin elongate housing having a closed end and an open end, and a front sidewall and a rear sidewall; and a detector unit inserted and firmly held in the elongate housing, wherein:

the front sidewall of the elongate housing forms a detecting surface that faces the rotating object;

the detector unit is a molded unit that includes a sensor element and an integrated circuit for processing signals from the sensor element, both of the sensor element and the integrated circuit being molded together;

the rotational speed detector further comprises a center rod having a terminal wire molded therein with resin forming the center rod; and the terminal wire is electrically connected to a lead wire led out from the detector unit;

the housing includes a projection formed at the open end thereof;

the center rod includes a depression formed at one end thereof; and the housing and the center rod are connected to each other by inserting the projection of the housing into the depression of the center rod.

14. The rotational speed detector as in claim 13, wherein:

a resin material fills a portion of an inside space of the housing at a position close to the open end and covers at least an outer periphery of the housing at a position close to the open end, the resin material forming a resin mold.

15. The rotational speed detector as in claim 14, wherein:

a projected portion is formed around the outer periphery of the housing at a position close to the open end, and the housing is firmly connected to the resin mold by welding the projected portion.

16. The rotational speed detector as in claim 14, wherein:

a ditch is formed on an inner surface of the rear sidewall, and the resin material further fills the ditch thereby to tightly hold the detector unit in the housing.

17. The rotational speed detector as in claim 14, wherein:

the resin material further covers an outside of the center rod, thereby integrally forming the resin mold.

18. The rotational speed detector as in claim 17, wherein:

an outer groove in which a seal ring is to be disposed is formed around an outer periphery of the resin mold at a position close to the open end of the housing.

* * * * *